United States Patent
Araki et al.

(10) Patent No.: US 10,353,613 B2
(45) Date of Patent: Jul. 16, 2019

(54) COMPUTER SYSTEM AND CONTROL METHOD THEREFOR FOR HANDLING PATH FAILURE

(71) Applicant: Hitachi, Ltd., Tokyo (JP)

(72) Inventors: Akihiko Araki, Tokyo (JP); Yusuke Nonaka, Tokyo (JP); Masanori Takada, Tokyo (JP); Naoya Okada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 15/506,967

(22) PCT Filed: Nov. 12, 2014

(86) PCT No.: PCT/JP2014/079905
§ 371 (c)(1),
(2) Date: Feb. 27, 2017

(87) PCT Pub. No.: WO2016/075765
PCT Pub. Date: May 19, 2016

(65) Prior Publication Data
US 2017/0277914 A1    Sep. 28, 2017

(51) Int. Cl.
*G06F 11/00* (2006.01)
*G06F 3/06* (2006.01)
*G06F 11/20* (2006.01)

(52) U.S. Cl.
CPC ............ *G06F 3/064* (2013.01); *G06F 3/0634* (2013.01); *G06F 3/0635* (2013.01); *G06F 11/20* (2013.01);
(Continued)

(58) Field of Classification Search
CPC .... G06F 11/20; G06F 11/2007; G06F 11/201; G06F 11/2017; G06F 3/0619; G06F 3/0634; G06F 3/0635; G06F 3/064
See application file for complete search history.

(56) References Cited

U.S. PATENT DOCUMENTS

| | | |
|---|---|---|
| 8,402,189 B2 | 3/2013 | Koga et al. |
| 2004/0139168 A1 | 7/2004 | Tanaka et al. |

(Continued)

FOREIGN PATENT DOCUMENTS

| | | |
|---|---|---|
| JP | 2004-220216 | 8/2004 |
| JP | 2010-218198 | 9/2010 |

OTHER PUBLICATIONS

International Search Report and Written Opinion for PCT App No. PCT/JP2014/079905 dated Feb. 17, 2015, 8 pgs.

*Primary Examiner* — Marc Duncan
(74) *Attorney, Agent, or Firm* — Procopio, Cory, Hargreaves & Savitch LLP

(57) ABSTRACT

When mounting hardware which is coupled to another portion by a plurality of paths with different applications, despite the hardware being a single device, and a failure occurs in any of the paths, there is a risk that the failure may propagate to other components unless the other paths are also blocked.

In order to solve the problem described above, in a storage apparatus to which a device coupled by a plurality of coupling paths with different applications can be mounted, the present invention determines a block range at the time of an occurrence of a failure to be a device and a plurality of coupling paths coupled to the device, manages the block range, and upon an occurrence of a failure, executes failure handling which involves blocking an appropriate block range determined in advance by referring to the information.

12 Claims, 7 Drawing Sheets

(52) U.S. Cl.
CPC ...... *G06F 11/2007* (2013.01); *G06F 11/2017* (2013.01)

(56) References Cited

U.S. PATENT DOCUMENTS

| | | | |
|---|---|---|---|
| 2005/0172043 A1* | 8/2005 | Nonaka | G06F 3/0614 710/5 |
| 2007/0168559 A1* | 7/2007 | Tanaka | G06F 3/0614 709/246 |
| 2011/0004708 A1* | 1/2011 | Kondo | G06F 3/0614 710/38 |

* cited by examiner

| Device type | Block range |
|---|---|
| Block interface module (FC 8 Gbps) | Device and path connected to device |
| Block interface module (FC 4 Gbps) | Device and path connected to device |
| Block interface module (iSCSI 10 Gbps) | Device and path connected to device |
| Block interface module (iSCSI 1 Gbps) | Device and path connected to device |
| File service module | Device and 2 paths connected to device |

FIG 3

| Path no. | Device type | Device identification information | Block range |
|---|---|---|---|
| 0 | File service module | 0x00A1DF01 | Path 0, path 1, and file service module connected to both path 0 and path 1 |
| 1 | File service module | 0x00A1DF01 | Path 0, path 1, and file service module connected to both path 0 and path 1 |
| 2 | File service module | 0x00A1DF02 | Path 2, path 3, and file service module connected to both path 2 and path 3 |
| 3 | File service module | 0x00A1DF02 | Path 2, path 3, and file service module connected to both path 2 and path 3 |
| 4 | FC 8 Gbps | 0x02B334A01 | Path 4 and FC 8 Gbps block interface module connected to path 4 |
| 5 | Unmounted | – | – |

FIG 4

COMPUTER SYSTEM AND CONTROL METHOD THEREFOR FOR HANDLING PATH FAILURE

CROSS-REFERENCE TO RELATED APPLICATIONS

This application is a U.S. National Stage entry of PCT Application No: PCT/JP2014/079905 filed Nov. 12, 2014, the contents of which are incorporated herein by reference.

TECHNICAL FIELD

The present invention relates to a storage apparatus.

BACKGROUND ART

Usually, modules constituting a system are coupled to each other by one or a plurality of paths. When modules are coupled to each other by a single path and a failure occurs in any of the modules or on the coupling path, an influence range of the failure is restricted by blocking the relevant module and the coupling path to increase failure tolerance of the entire system (for example, refer to PTL 1).

Coupling modules to each other by a plurality of paths is intended to improve redundancy and performance. In this case, when a failure occurs in any of the modules, the module and all coupling paths are blocked. When a failure occurs on any one of the plurality of coupling paths, there may be cases where only the failed coupling path is blocked and operation is continued using the remaining paths.

CITATION LIST

Patent Literature

[PTL 1]
U.S. Pat. No. 8,402,189

SUMMARY OF INVENTION

Technical Problem

With the diversification of data to be processed, cases where systems are constructed by coupling a plurality of various modules are also increasing. Furthermore, a plurality of processing programs may be prepared in a storage controller in accordance with the types of data to be processed.

Amid the increase in complexity of such systems, modes are conceivable in which one module is coupled to another module by two or more paths, where each of the paths is used for a different application.

When hardware coupled by paths to be used for different purposes, despite the hardware being a single device, is mounted and a permanent failure occurs on one of the paths, only blocking the device or the path may cause the failure to spread to the other path and hinder normal operations of a CPU and other devices.

Solution to Problem

In order to solve the problem described above, the present invention discloses a computer system including a control unit, a storage unit, and at least one module coupled to the control unit, wherein the at least one module is coupled to the control by a plurality of paths having different applications. The storage unit has block range information which defines a block range when a failure occurs on each of the paths or in the module, and the control unit is configured to, upon detection of a failure on the paths, implement blocking of the module coupled to the path in which the failure has occurred and the other path coupled to the module based on the block management information.

Advantageous Effects of Invention

The present application enables failure handling to be performed on an appropriate range even in modes mounted with a single device using a plurality of paths and is capable of improving reliability and availability of a system.

BRIEF DESCRIPTION OF DRAWINGS

FIG. 3 is a diagram showing an example of a device type table included in a storage system according to the present invention.

FIG. 4 is a diagram showing an example of a failure handling range management table according to the present invention.

DESCRIPTION OF EMBODIMENT

Hereinafter, an example of an embodiment of the present invention will be described with reference to the drawings. It should be noted that, in the following embodiment, portions having a same structural part and assigned a same reference sign perform same operations in principle and overlapping descriptions have been omitted.

Recently, unified storages which accommodate a plurality of types of host interface protocols are garnering attention. A plurality of types of host interfaces may include FCP (Fiber Channel Protocol for SCSI) and iSCSI (internet SCSI) which accept access requests in block units such as a SCSI command, and CIFS (Common Internet File System)) and NFS (Network File System) which accept access requests in file units. In the present embodiment, the present invention will be disclosed using such a unified storage as an example of a storage system.

Conceivable systems for realizing a unified storage include a mode where a plurality of OSs (Operating Systems) and hardware coexist in a storage apparatus and data is stored in a disk array in the apparatus in a centralized manner. In an example of such a mode, a hardware group having a file service function is coupled as a PCIe (PCI Express) device of a block storage, and a block program which is software for controlling the entire block storage and a file program which is software for controlling the hardware group having a file service function are concurrently run on a CPU of a controller of the block storage. The block program is responsible for protocol processing of FCP or iSCSI while the file program or the hardware group having a file service function is responsible for protocol processing of CIFS or NFS.

Protocol processing of CIFS, NFS, or the like performed by the file program or the hardware group providing a file service is issued to the block program as a disk I/O or, in other words, a SCSI command via a file system function provided by the hardware group having a file service function or by the file program. While an FC cable or the like is used as physical coupling and FCP or iSCSI is used as a protocol between a conventional file server and a block storage, when a file service function is mounted inside a single storage apparatus, for example, coupling by PCIe is conceivable. In this case, the hardware group having a file service function is to be coupled to the CPU by two or more PCIe paths despite being a single PCIe device. A part of the plurality of PCIe paths is used for control by a file program and another part thereof is coupled to a block program to be used for exchanging SCSI commands and data.

Figure 1:
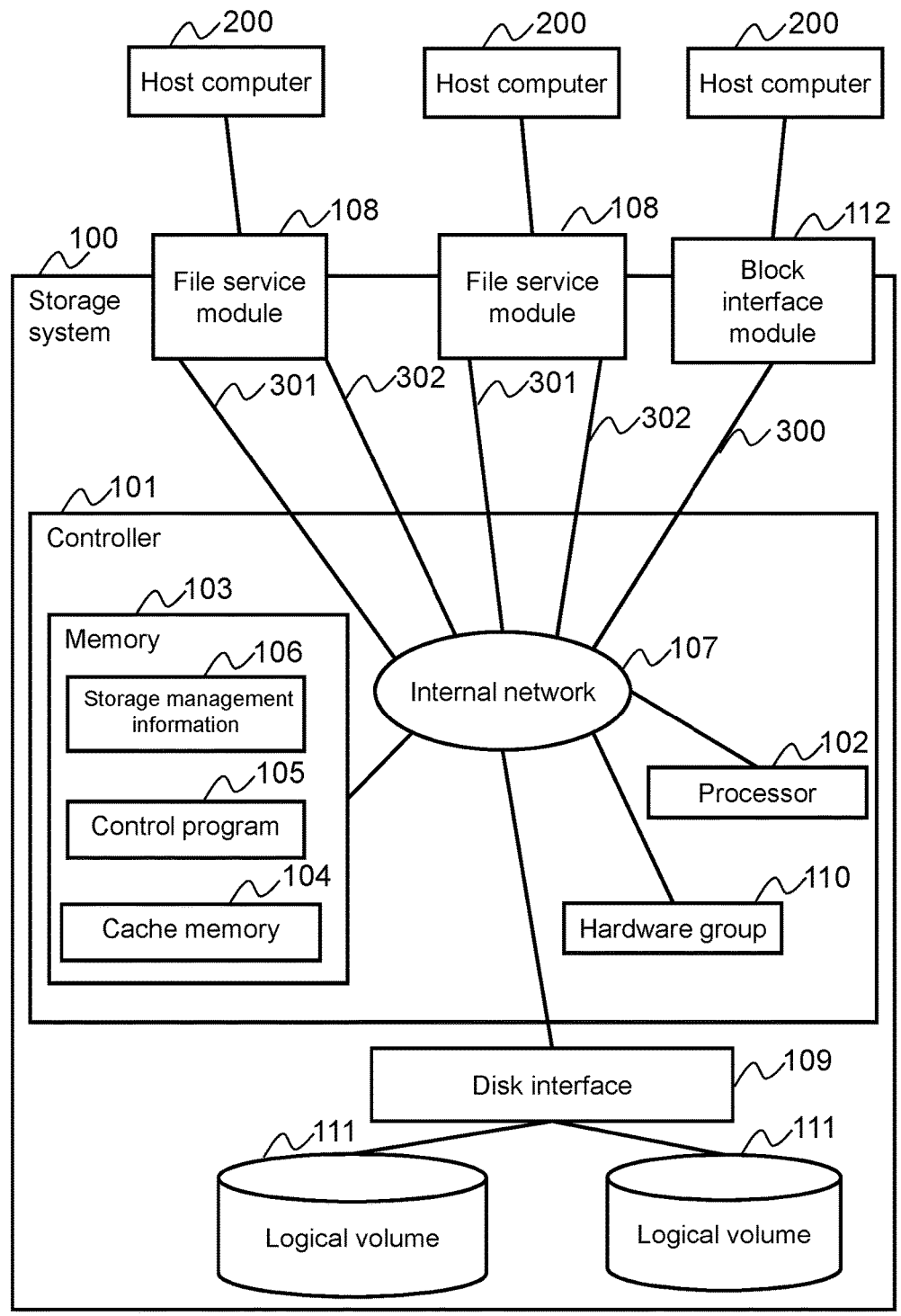
FIG. 1 is a diagram showing an example of an apparatus configuration of a storage system according to the present invention.

FIG. 1 is a diagram showing an outline of an example of a system configuration that is a target of the present invention. A storage system 100 includes a controller 101, a file service module 108, and a disk interface 109. The controller 101 is internally provided with a processor 102, a memory 103, and a hardware group 110 which are coupled to each other by an internal network 107. The internal network 107 is also coupled to the file service module 108 and the disk interface 109.

The memory 103 stores a control program 105 and storage management information 106 in addition to a cache memory 104 which is a temporary storage area of data and control information to be stored in logical volumes 111. The cache memory 104 may be stored in a memory which physically differs from a memory storing the control program 105 and the storage management information 106. The processor 102 includes a CPU and controls the entire storage system 100 using the control program 105. The hardware group 110 includes a nonvolatile memory, an interface coupling a management computer outside of the storage system 100 with the storage system 100, power supplying hardware, and a failure handling auxiliary apparatus for safely stopping the storage system 100 when the processor 102 lapses into an inoperable state and notifying the outside. The logical volumes 111 are storage areas logically constructed from a storage area of a single or a plurality of nonvolatile storage media and store data and control information.

The control program 105 is a software program which runs on the processor 102. In the present invention, there are programs of a plurality of types. In the present embodiment, the control program 105 at least includes a block program 120 which provides a service (block service) with respect to access requests in block units and a file program 130 which controls the file service module 108. In other words, different programs which control two different devices are run. Each program may independently run on the controller 101 or the file program 130 may run as a component of the block program 120. Furthermore, the control program 105 includes a program for communicating with an outside management computer to provide a management function and a program for providing operation monitoring and failure handling of the entire storage system 100.

Failure handling refers to a series of processes for detecting and recovering from a failure having occurred in hardware constituting a storage apparatus such as a CPU, a DIMM, or a PCIe device. Recovery includes so-called blocking which involves, for example, when a permanent failure makes hardware unusable or when a temporary failure occurs frequently within a short period of time and affects stable operation, decoupling the failed hardware from the system. In order to increase availability of the system, blocking desirably enables so-called partial blocking in which, to the greatest extent feasible, only hardware in which a failure had occurred is decoupled.

In addition, these programs may be flexibly switched between running and non-running states in accordance with applications of the storage system 100. For example, a program controlling the file service module 108 may be configured to run only when the file service module 108 is mounted. In addition, a program providing a block service may also provide failure handling. However, in a desirable configuration, the program providing a block service and the program providing failure handling are always running.

A block interface module 112 is a module which provides a block interface such as FCP or iSCSI. The block interface module 112 sends and receives SCSI commands to and from host computers 200 and performs data transfer to and from the host computers 200. The block interface module 112 may be mounted and replaced independently of the storage system 100. The block interface module 112 is coupled to the internal network 107 by an I/O path 300. User data transmitted to and received from the host computers 200 is exchanged via the block interface module 112.

The file service module 108 includes a file program or a hardware group having a file service function and has a function for providing a file service by performing protocol processing of CIFS or NFS. Although the file service module 108 may be mounted and replaced independently of the storage system 100, the file service module 108 is controlled by the processor 102 via the internal network 107. The file service module 108 is coupled to the host computers 200 and transmits and receives I/O requests and data to and from the host computers 200. The file service module 108 and the internal network 107 are coupled to each other by an I/O path 301 and a control path 302. The I/O path 301 is a communication path of block I/O issued by the file service module 108, and user data transmitted to and received from the host computers 200 is exchanged via the file service module 108. The control path 302 is a communication path for controlling the file service module 108 and is not used to exchange user data. Instead, the control path 302 is used to exchange control signals with the control program 105. Controlling the file service module 108 refers to, for example, managing a state of hardware operating inside the file service module 108, configuring parameters of the file service module 108 in accordance with an operation on a management computer outside the apparatus, controlling and managing functions provided by the file service module 108, and the like. The I/O path 301 and the control path 302 are internal paths such as PCIe. The I/O path 301 and the control path 302 may physically be coupling paths of a same type.

Storage management information 106 refers to various types of information necessary for the storage system 100 to operate and includes a device type table shown in FIG. 3 and a block range management table 402 shown in FIG. 4. The storage management information 106 may also include, for example, directory information for managing the cache memory 104, management information necessary for realizing snapshot and data copying program functions, configuration information for managing states of components such as the file service module 108, the I/O path 301, the control path 302, and the processor 102 included in the storage system 100. In configuration information, for example, when the file service module 108 is decoupled from the storage system 100, the file service module 108 is managed as being in an unmounted state, and when the file service module 108 is mounted but not operating due to a factor such as a failure, the file service module 108 is managed as being in a blocked state. When the file service module 108 is in a blocked state, the I/O path 301 and the control path 302 being coupled to the file service module 108 may be considered being in a blocked state at the same time. With a configuration in which the block interface module 112 is mounted, when the block interface module 112 is in a blocked state, the I/O path 300 being coupled to the block interface module 112 may be considered being in a blocked state at the same time. When the processor 102 can be blocked for each CPU core and a CPU core used by the file program 130 (to be described later) is in a blocked state, the block interface module 112 may be considered being in a blocked state at the same time.

Figure 2:
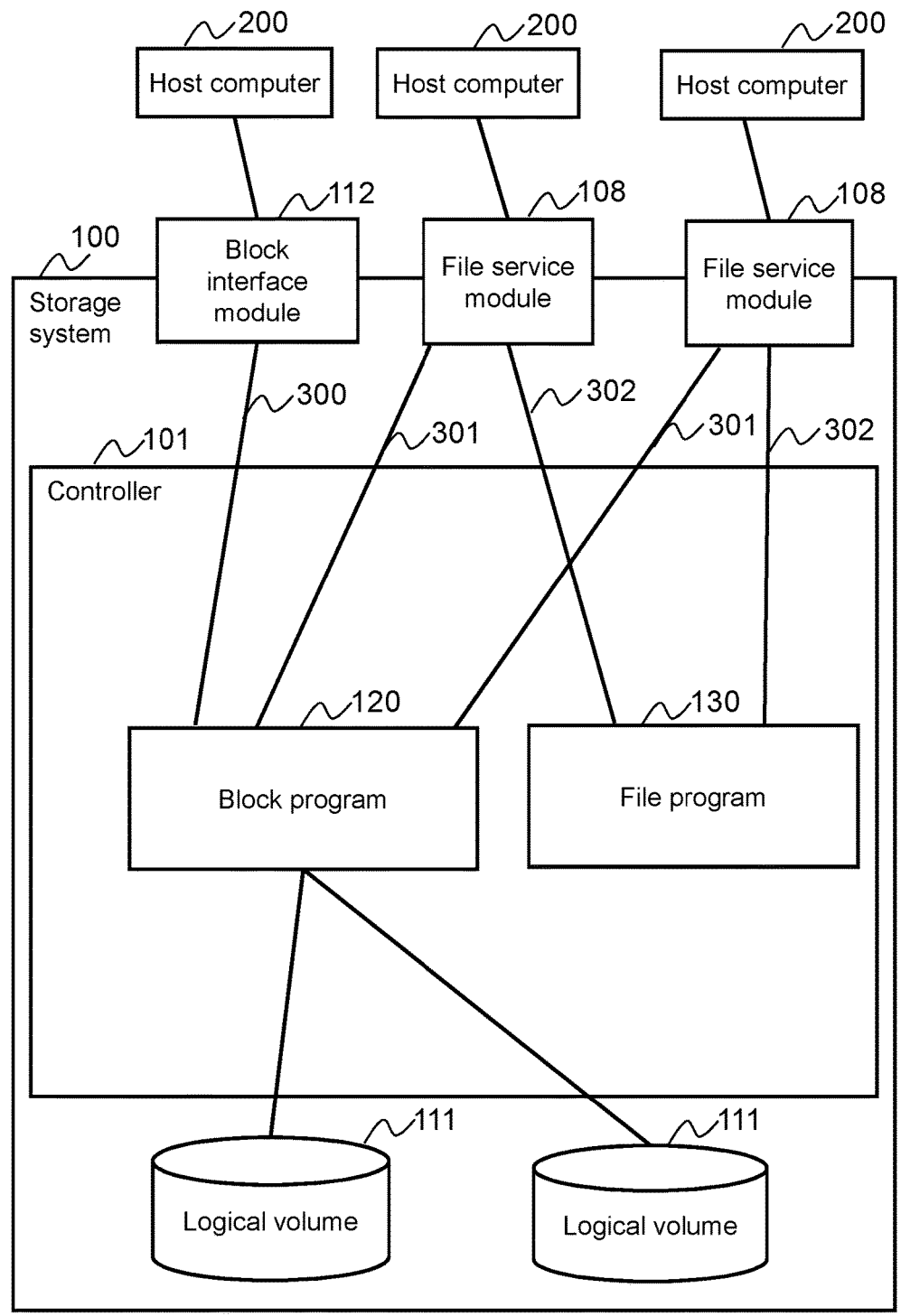
FIG. 2 is a diagram showing an example of an apparatus configuration of a storage system according to the present invention.

FIG. 2 is a diagram focusing on a correspondence among the block program. 120 and the file program. 130 included in the control program 105 which runs on the processor 102 shown in FIG. 1, the file service module 108, and the logical volumes 111. The block program 120 and the file program 130 respectively realize a block I/O processing unit and a file I/O processing unit by being executed by the processor 102.

The file program 130 controls the file service module 108 and, for example, manages a state of hardware operating inside the file service module 108, configures parameters of the file service module 108 in accordance with an operation on a management computer outside the apparatus, controls and manages functions provided by the file service module 108, and the like through the control path 302. The file program 130 also controls the file service module 108 via the control path 302 so that an I/O request received from the host computers 200 is transferred to the block program 120 when necessary. The file program 130 is unrelated to the block interface module 112.

On the other hand, the block program 120 is software for processing block I/O. The block program 120 receives a block I/O request from the block interface module 112 via the I/O path 300, performs reading and writing of user data stored in the logical volumes 111 in accordance with the I/O request, and exchanges the user data with the block interface module 112 via the I/O path 300. The block program 120 further performs various functions included in the storage system 100. The various functions include duplicating data or the logical volumes 111 inside or outside the storage system 100 and sharing data or the logical volumes 111 with a storage system 100 at a remote location. In addition, the block program 120 controls hardware inside the storage system 100, transmits a state of the storage system 100 to the management computer outside of the apparatus, and creates a logical volume or changes a type of a recording medium constituting a logical volume in accordance with a request received from the management computer. Furthermore, the block program 120 receives a block I/O request from the file service module 108 via the I/O path 301, performs reading and writing of user data stored in the logical volumes 111, and exchanges the user data with the file service module 108 via the I/O path 301.

In the unified storage system configuration according to the present embodiment, since the block program 120 controls the entire storage system 100 and also provides various functions and a block I/O from the file service module 108 is always exchanged via the block program 120, data consistency is always guaranteed with respect to all data handled by the storage system 100 and consistent functions are to be provided.

In a desirable configuration, monitoring of operations of the entire storage system 100 including the file service module 108 is performed by the block program 120. For example, when a failure occurs in the file service module 108, the block interface module 112, the I/O path 300, the I/O path 301, or the control path 302, the block program 120 detects the failure and performs failure handling in accordance with contents of the failure. This is because, in the storage system. 100, the block program which handles disk I/O is required higher reliability and, in addition, a configuration in which the file service module 108 is not mounted or a situation where the file program 130 is not running is also conceivable.

Moreover, a configuration may be adopted in which the file program 130 only detects and performs recovery from minor failures among failures having occurred in the file service module 108. Examples of a minor failure include a so-called correctable error which is an error that can be corrected by hardware. In addition, when a prescribed number of correctable errors occur within a prescribed period of time, the operation of the file service module 108 may be stopped as preventive maintenance. In this case, the file program 130 and the block program 120 may communicate with each other and the block program 120 may stop the file service module 108 in a safe manner. A method of communication between programs may involve communicating via a shared memory or performing an interruption. In a mode in which the block program 120 includes a hypervisor function and the file program 130 operates as a virtual machine, a communication API (Application Programming Interface) may be used. Specifically, safely stopping the file service module 108 may involve turning off a power supply of the file service module 108 or disabling the I/O path 301 or the control path 302 coupled to the file service module 108 and disabling an interface portion with the host computers 200.

FIG. 3 is a diagram showing an example of a device type table 401 according to the present invention. The present table is a component of storage management information 106 and is configured in advance. The present table stores device types and a failure handling range in accordance with each device type. When a failure occurs at any location in the system, desirably, an effect of the failure is limited to a minimum range while processing is continued in the system as a whole. For example, when a permanent failure occurs in a PCIe device or on a PCIe path, desirably, the PCIe device in which the failure had occurred and a PCIe path coupled to the device are blocked by being linked-down while the CPU and other devices operate continuously. Meanwhile, the file service module 108 according to the present application is coupled to two different control programs, namely, the file program 130 and the block program 120. For example, when a failure occurs on the control path 301, the file service module 108 which is a coupling destination can be readily set as a block target. However, this alone is insufficient in the embodiment of the present application and the control line 302 coupled to the file service module 108 must also be blocked. In the present application, a range to be subject to failure handling is managed for each path and each device in consideration of the situations described above.

A device type refers to information which enables a type of a device constituting the storage system 100 to be identified. Examples may include the file service module 108 and the block interface module 112 coupled to the controller 101. Furthermore, even a type of a protocol chip included in the block interface module 112 may be defined. While a device type and a block range are described in text in FIG. 3, any information which enables the block program 120 to recognize a processing target device may suffice. Numerical values may be stored such as a device type 0x01 representing Fibre Channel 8 Gbps.

When the block interface module 112 is coupled to the controller 101 by one or a plurality of redundant PCIe paths and a failure occurs in the block interface module 112 and the PCIe path coupled to the block interface module 112, desirably, the block interface module 112 and the PCIe path coupled to the block interface module 112 are blocked at the same time. Therefore, in the case of the block interface 112, setting only the module and the path coupled to the device as block targets is sufficient to prevent other components from being affected.

On the other hand, the file service module 108 includes the I/O path 301 and the control path 302. When a failure occurs in the file service module 108, the I/O path 301, or the control path 302 and any of these component can no longer be continuously used, a block range desirably is all of the file service module 108 as well as the I/O path 301 and the control path 302 coupled to the file service module 108. For example, when a failure which disables continuous use occurs on the control path 302 and only the control path 302 is blocked, the file service module 108 can no longer be controlled. As a result, unauthorized data may be sent along the I/O path 301 and cause data destruction or the like. In addition, for example, when a failure which disables continuous use occurs on the I/O path 301, the file service module 108 can no longer request block I/O to the block program 120 and can no longer receive block I/O from the block program 120. In other words, since functions as the file service module 108 can no longer be fulfilled, it is expected that an attempt to restore functions is to be made by replacing the file service module 108. Assuming that the file service module 108 is to be replaced, desirably, the file service module 108 and the I/O path 301 in which a failure has not occurred are also blocked at the same time. As described above, since an influence range of failure handling differs for each device, influence ranges are managed by the device type table 401. Moreover, the device type table 401 itself may be a static table and may be included in the storage system 100 in advance in a fixed manner. Alternatively, items may be added according to an instruction from the management computer outside of the storage system 100.

FIG. 4 is a diagram showing an example of the block range management table 402 according to the present invention. The block range management table 402 manages associations between a path number or device identification information which identifies an arbitrary device and information on a block range which is information identifying a device requiring failure handling when a failure occurs in the device. For example, when the controller 101 couples the file service module 108, the block interface module 112, and the like by PCIe, a device coupled at the time point, identification information of the device, and a block range corresponding to the coupled device are registered for each number of the PCIe paths of the controller 101. For the device type, a numerical value that can be recognized by the block program 120 may be stored in a similar manner to FIG. 3. Identification information refers to information enabling a device to be uniquely identified when, for example, a device of a same type is mounted in plurality. For example, a serial number may be used as identification information.

A block range can be configured by referring to the device type table shown in FIG. 3. A block range may be stored in a bitmap format which assumes a path number to be 1 bit when specifying path numbers. While the file service module 108 uses the I/O path 301 and the control path 302 in the present invention, when a plurality of file service modules 108 are mounted, the I/O path 301 and the control path 302 are also provided in plurality. In such a case, in order to appropriately configure a block range, combinations of the plurality of file service modules 108 and the plurality of I/O paths 301 and control paths 302 must be correctly distinguished from one another. Device identification information is used in order to do so. In other words, based on the device identification information, block ranges are configured based on correct combinations of the plurality of file service modules 108 and the plurality of I/O paths 301 and control paths 302. Moreover, when a same type of device is not mounted in plurality due to restrictions of the storage system 100, device identification information need not necessarily be used.

Contents of the block range management table 402 change dynamically. This is because the file service module 108 and the block interface module 112 can be attached or detached and replaced with different types even when the storage system 100 is in operation. The block range management table 402 is created or updated at timings such as when the storage system 100 is started up and when the file service module 108 or the block interface module 112 is attached or detached, and is referred to during failure handling when a failure occurs.

Desirably, the device type table 401 and the block range management table 402 can be updated and referred to by a program for controlling the entire storage system 100 or by a program which runs as a failure handling entity. In the unified storage configuration according to the present embodiment, since the block program 120 corresponds to these programs, the block program 120 is capable of updating and referring to the device type table 401 and the block range management table 402.

Figure 5:
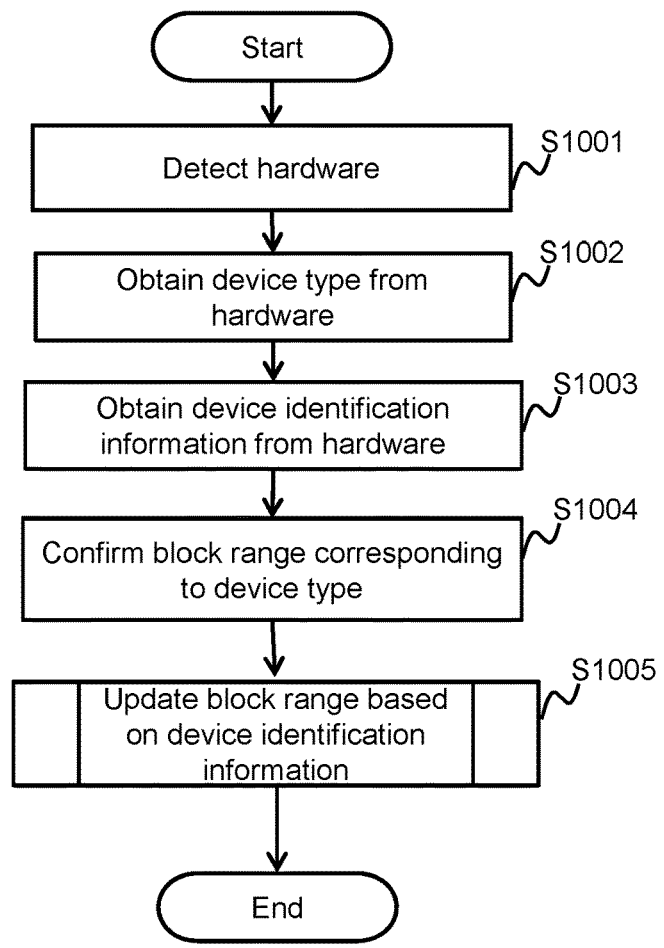
FIG. 5 is a flow chart showing an example of processing for creating a failure handling range management table according to the present invention.

FIG. 5 is a flow chart showing an example of an update process of the block range management table 402 shown in FIG. 4. While the respective processes shown in FIG. 5 are to be mainly performed by the block program 120, the present invention is not limited thereto and the processes may be performed by, for example, a combination of the block program 120 and the file program 130 or with the cooperation of the hardware group 110 or the management computer outside of the apparatus. For example, processing may be started immediately after the block program 120 detects coupling of the file service module 108 or the block interface module 112 or processing may be started after receiving an instruction from the management computer. The block program 120 may start processing after the hardware group 110 detects coupling of the file service module 108 or the block interface module 112 and issues an instruction to the block program 120. Moreover, while an update process will be described in the present embodiment, a similar flow is to be executed when configuring the failure range management table 402 for the first time, in which case an initial value is to be configured in the process of S1005.

First, hardware coupled to the storage system 100 is detected (step S1001). In FIG. 5, hardware refers to the file service module 108 and the block interface module 112. The process of step S1001 is performed as shown in FIG. 5 during, for example, a startup process of the storage system 100 which is started after mounting the file service module 108 to the storage system 100 in advance.

Next, a device type is obtained from the hardware (step S1002). Generally, a CPU having recognized hardware performs several initialization and initial configuration operations in order to make the hardware usable. For example, in the case of a PCIe device, a configuration process is performed. In step S1002, a device type is obtained from coupled hardware according to a prescribed procedure during such initial configuration. A device type refers to a type of a device such as those shown in the device type table 401. For example, in the case of a PCIe device, a prescribed procedure may involve referring to a vendor ID or a device ID of a configuration space register. Moreover, in step S1001, it is assumed that the number of a coupling path to which the hardware is coupled is also stored at the same time.

Next, device identification information is obtained from the hardware (step S1003). Device identification information may be, for example, a serial number and may be information uniquely assigned to a device. In addition, for example, when a plurality of paths are used as in the case of the file service module 108, same device identification information must also be shown with respect to the I/O path 301 and the control path 302.

Next, by referring to the device type table 401, a block range is confirmed based on the device type obtained in step S1002 (step S1004). For example, when the device type obtained in step S1002 is the file service module 108, the block range is "the file service module as well as the I/O path 301 and the control path 302 coupled to the file service module". In step S1005, the block range is updated based on the device identification information. Step S1005 will be described with reference to FIG. 6.

Figure 6:
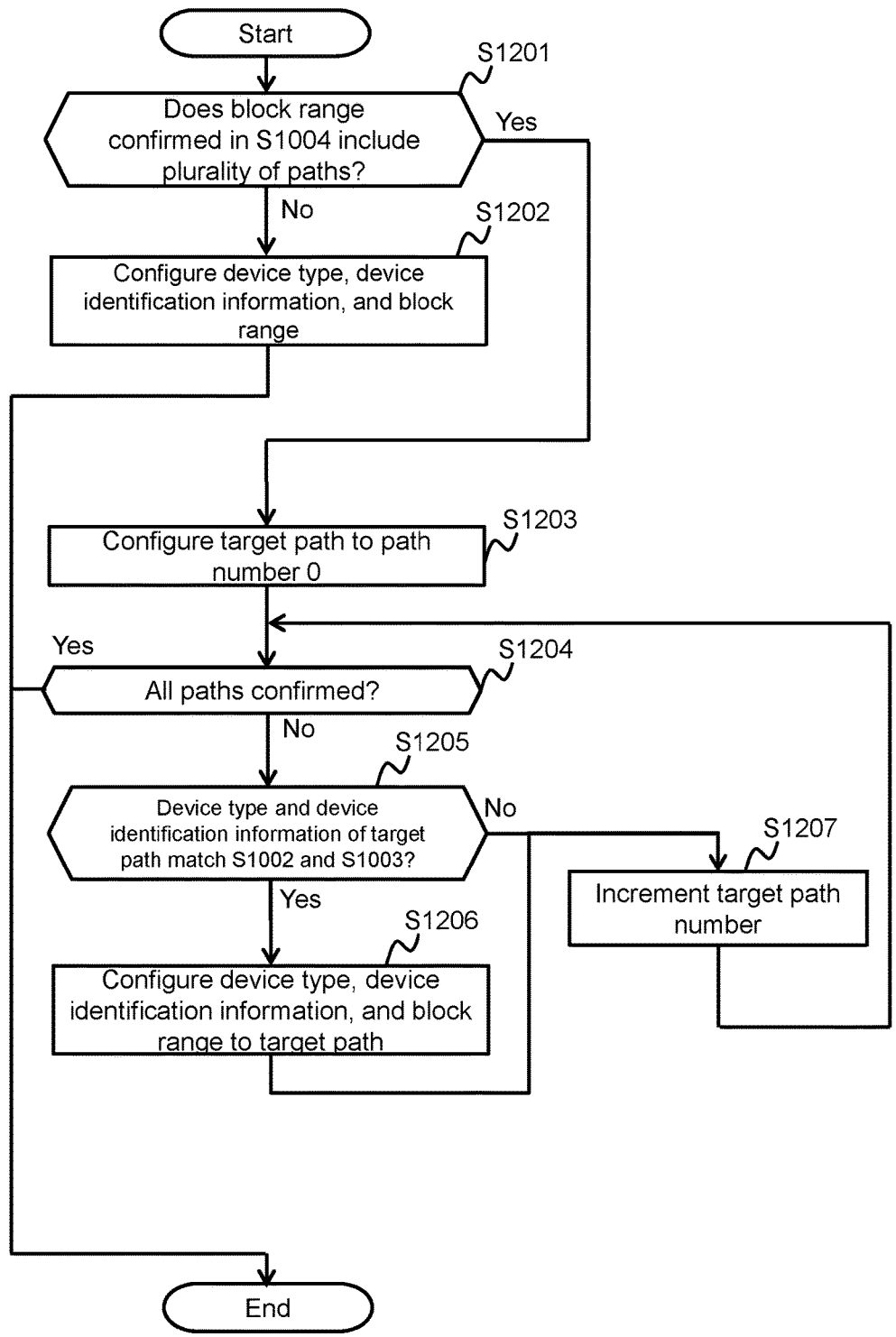
FIG. 6 is a flow chart showing an example of processing for creating a failure handling range management table according to the present invention.

FIG. 6 is a flow chart showing an example of a process of updating a block range. First, a determination is made on whether or not the block range confirmed in step S1004 includes a plurality of paths (step S1201). When a result of the determination is No, a device type, device identification information, and a block range are configured for the path number corresponding to the hardware detected in S1001 in the block range management table 402 (step S1202). When the result of the determination in step S1201 is Yes, the process advances to step S1203. Steps S1203 and thereafter constitute a loop process for confirming all paths in order to configure the block range confirmed in S1004.

In step S1203, a target path is configured to path number 0. Next, in step S1204, with respect to all paths, a determination is made on whether or not processes of step S1205 to step S1208 have been performed. When a result of the determination of step S1204 is Yes, the process is ended. When the result of the determination is No, the process advances to step S1205.

In step S1205, a device type and device identification information are obtained from a device coupled to the target path, and a determination is made on whether or not the device type and the device identification information match those obtained in step S1002 and step S1003. When a result of the determination is Yes, the process advances to step S1206. When the result of the determination is No, the process advances to step S1207.

In step S1206, a device type, device identification information, and a block range are configured for the target path in the block range management table 402, and the process advances to step S1207. In step S1207, the target path number is incremented and the process returns to step S1204.

When the device type is a file service module, two paths, namely, the I/O path 301 and the control path 302 are used. The two paths share same device identification information of a coupling destination and therefore can be identified. For example, when the file service module 108 is coupled to path number 0 and path number 1, the same device identification information is to be shown for path number 0 and path number 1. In other words, in this case, as the block range in the failure range management table 402, "the file service module coupled to path and path number 0" is first stored with respect to path number 0 and "the file service module coupled to path and path number 1" is then stored with respect to path number 1. In addition, "path number 1" having the same device identification information is next added with respect to path number 0 and, finally, "path number 0" is added with respect to path number 1 for the same reason.

On the other hand, when the device type is the block interface module 112, for example, when the block interface module 112 is coupled to path number 4, "the block interface module coupled to path and path number 4" is stored as the block range in the failure range management table 402.

According to the processes described above, a block range with respect to a path or a device is configured. In a configuration in which a plurality of devices are mounted, processes shown in hardware FIG. 5 may be repetitively performed in, for example, an ascending order of path numbers in the block range management table 402.

Figure 7:
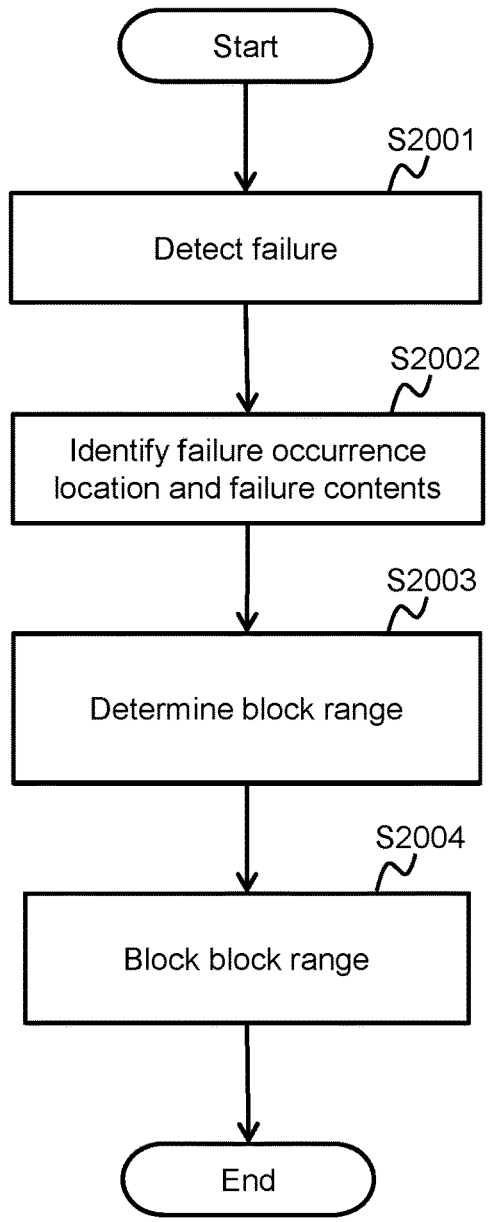
FIG. 7 is a flow chart showing an example of failure handling of a storage system according to the present invention.

FIG. 7 is a processing flow showing an example of failure handling according to the present invention. While the respective processes shown in FIG. 7 are to be mainly performed by the block program 120, the present invention is not limited thereto and the processes may be performed by, for example, a combination of the block program 120 and the file program 130 or with the cooperation of the hardware group 110 or the management computer outside of the apparatus.

First, a failure having occurred in a component of the storage system 100 is detected (step S2001). A detection method may involve an interrupt from a failure location or a failure may be detected by regularly monitoring components of the storage system 100. Alternatively, a notification may be made from the hardware group 111.

Next, a failure occurrence location and failure contents are identified (step S2002). When an occurrence of a failure is detected in step S2001, after identifying a specific failure occurrence location and specific failure contents, failure handling must be performed on an appropriate failure range. In step S2002, a failure location and failure contents are identified by methods such as checking an interrupt type, an interrupt vector number, or contents of a failure register. A failure location is identified as, for example, a path number or device identification information. Failure contents may represent a failure type such as a correctable failure, an uncorrectable failure, and an integrity code error.

Next, a block range is determined (step S2003). Steps S2003 and thereafter may be performed only when a failure location and failure contents are identified in step S2002 and when it is determined that blocking is even partially necessary in the storage system 100. When the failure contents represent a failure serious enough to affect the entire storage system 100, the entire storage system 100 may be immediately blocked without performing steps S2003 and thereafter.

In step S2003, the block range management table 402 is referred to based on the failure location identified in step S2002, and a block range may be determined by referring to a block range corresponding to the block occurrence location. For example, in step S2002, when it is identified that an uncorrectable failure has occurred on path number 0, in step S2003, a block range of the path number 0 in the failure range management table 402 is referred to and, in the example shown in FIG. 4, a block range corresponding to a file service module (with a device identification number of 0X00A1DF01) is determined. In addition, when a failure occurs in the file service module (with a device identification number of 0X00A1DF01) 108 instead of on a path, a block range corresponding to the file service module (with a device identification number of 0X00A1DF01) is determined by referring to a block range of the path number 0 or the path number 1 for which the device identification number (0X00A1DF01) is managed in the failure range management table 402.

Finally, the block range is blocked (step S2004). Blocking may differ depending on a block target location. For example, in the configuration of the present embodiment, when a permanent failure occurs in the block interface module 112 or on the PCIe path 300, the PCIe path 300 coupled to the block interface module 112 is linked down.

On the other hand, when a permanent failure occurs in at least one of the file service module 108, the I/O path 301, and the control path 302, both the I/O path 301 and the control path 302 are to be linked down. This is done to prevent the I/O path 301 from being continuously used when only the control path 302 is linked down and avoid receiving unauthorized data from the file service module 108 that has become uncontrollable. In addition, while the file service module 108 in which a failure has occurred can be replaced with a normal file service module, both the I/O path 301 and the control path 302 are to be linked down in order to avoid an occurrence of a different failure "Surprise Linkdown" when the file service module 108 is extracted from the storage system. 100 in a state where only one of the paths is linked down and to prevent inconveniences such as the processor 102 starting new failure handling.

When restart of the file program 130 is required as one of the processes of blocking of the file service module 108, the block program 120 restarts the file program 130 through communication between the programs described earlier. In addition, when blocking of the file program 130 is also required when blocking the file service module 108, the block program 120 blocks the file program 130. As described above, when a process with respect to the file program 130 is also necessary in a series of processes in addition to failure handling of hardware, the file program 130 may be added to the block range in the failure range management table 402. Alternatively, a column of additional processes may be added to the failure range management table 402 and the necessary process may be registered in the column. Conceivable timings at which these additional processes are to be performed include the timings at which step S1002 and step S1003 in FIG. 5 are executed, a timing at which a notification of an additional process is received from the file program 130, and a timing at which an instruction is received from the management computer outside of the storage system 100.

As described above, according to the invention of the present application, in a system constituted by a plurality of devices, blocking can be executed on a minimum necessary range in a noncontradictory manner when a failure occurs even when a certain device is being coupled to another portion by a plurality of paths with respectively different applications. Furthermore, blocking is effective even when a plurality of paths are respectively coupled to a plurality of different and independent processing units. Accordingly, an improvement in availability of the apparatus due to continuous operation of non-failure locations and an improvement in reliability of the apparatus by preventing a failure from propagating to the non-failure locations can be achieved.

Moreover, while the present application has been described on the premise of a unified system including the block function and the file function shown in FIG. 1 in the present embodiment, an application destination of the present invention is not limited to the present embodiment. For example, the invention of the present application can be applied when a single device is coupled by a plurality of types of paths to other portions such as a plurality of processing mechanisms for executing different processes. In addition, the number of processing units to which the single device is coupled may be equal to or larger than 2.

Moreover, it is to be understood that the present invention is not limited to the embodiment described above and is intended to cover various modifications. In addition, for example, components of the embodiment presented above have been described in detail in order to provide a clear understanding of the present invention, and the present invention is not necessarily limited to embodiments including all of the components described above. Furthermore, a part of the components of each embodiment may be added to, deleted from, or replaced with other components.

REFERENCE SIGNS LIST

100 Storage system
101 Controller
102 Processor
103 Memory
104 Cache memory
105 Control program
106 Storage management information
107 Internal network
108 File service module
109 Disk interface
110 Hardware group
111 Logical volume
112 Block interface module
120 Block program
130 File program
200 Host computer
300 I/O path
301 I/O path
302 Control path
401 Device type table
402 Block range management table

The invention claimed is:

1. A computer system comprising a control unit, a storage unit, and at least one module coupled to the control unit, wherein
the at least one module is coupled to the control unit by a plurality of paths having different applications,
the storage unit has block range information which defines a block range when a failure occurs on each of the paths or in the module, and
the control unit is configured to, upon detection of a failure on the paths, implement blocking of the module coupled to the path in which the failure has occurred and other ones of the plurality of paths coupled to the module based on block management information wherein the storage unit is configured to manage block range information for each module type, and the control unit is configured to generate, based on information on coupling between the module and the path, a relationship among the path, the module coupled to the path, and the path and the module which need to be blocked when a failure occurs in any of the paths and the module, and to store the relationship as the block range information.

2. The computer system according to claim 1, wherein the control unit includes a plurality of processing units which execute a process related to the at least one module, and the at least one module is coupled to each of the plurality of processing units by a different path.

3. The computer system according to claim 1, wherein when a failure is detected in the module, the module and the plurality of paths coupled to the module are blocked.

4. The computer system according to claim 3, wherein the computer system is a storage system including a block interface and a file interface, the at least one module is a file interface, a first processing unit among the processing units is a file I/O processing unit which is configured to control the file interface through the path being coupled thereto, and a second processing unit among the processing units is a block I/O processing unit which is configured to control I/O to and from a storage of data exchanged with a host via the file interface.

5. The computer system according to claim 4, wherein the blocking is executed according to an instruction from the block I/O processing unit.

6. The computer system according to claim 4, wherein when a failure occurs in the block interface or on a path coupled to the block interface, blocking is executed on the block interface and the path coupled to the block interface.

7. A computer system control method executed in a computer system including a control unit, a storage unit, and at least one module coupled to the control unit, the at least one module being coupled to another portion by a plurality of paths having different applications, the computer system control method comprising:

detecting a failure on the paths;

referring to block management information which manages block range information when a failure occurs in each of the paths or in the module; and blocking the module coupled to the path on which the failure has occurred and other ones of the plurality of paths coupled to the module;

wherein the storage unit is configured to manage block range information for each module type, and the control unit is configured to generate, based on information on coupling between the module and the path, a relationship among the path, the module coupled to the path, and the path and the module which need to be blocked when a failure occurs in any of the paths and the module, and to store the relationship as the block range information.

8. The computer system control method according to claim 7, wherein the control unit of the computer system includes a plurality of processing units which execute a process related to the at least one module, and the at least one module is coupled to each of the plurality of processing units by a different path.

9. The computer system control method according to claim 8, wherein when a failure is detected in the module, the module and the plurality of paths coupled to the module are blocked.

10. The computer system control method according to claim 8, wherein the computer system comprises a plurality of control units inclusive of the control unit;

the computer system is a storage system including a block interface and a file interface, the at least one module is a file interface, a first control unit among the plurality of control units is a file I/O processing unit which controls the file interface through the path being coupled thereto, and a second control unit among the plurality of control units is a block I/O processing unit which controls I/O to and from a storage of data exchanged with a host via the file interface.

11. The computer system control method according to claim 10, wherein the blocking is executed according to an instruction from the block I/O processing unit.

12. The computer system control method according to claim 10, wherein when a failure occurs in the block interface or on a path coupled to the block interface, blocking is executed on the block interface and the path coupled to the block interface.

* * * * *